United States Patent
Nagai et al.

(10) Patent No.: US 12,513,171 B2
(45) Date of Patent: Dec. 30, 2025

(54) ESTIMATION DEVICE, ESTIMATION METHOD, AND ESTIMATION PROGRAM

(71) Applicant: NTT, Inc, Tokyo (JP)

(72) Inventors: Tomohiro Nagai, Musashino (JP);
Masanori Yamada, Musashino (JP);
Tomokatsu Takahashi, Musashino (JP);
Yasuhiro Teramoto, Musashino (JP);
Yuki Yamanaka, Musashino (JP)

(73) Assignee: NTT, Inc., Tokyo (JP)

( * ) Notice: Subject to any disclaimer, the term of this patent is extended or adjusted under 35 U.S.C. 154(b) by 218 days.

(21) Appl. No.: 18/035,109

(22) PCT Filed: Nov. 19, 2020

(86) PCT No.: PCT/JP2020/043291
§ 371 (c)(1),
(2) Date: May 3, 2023

(87) PCT Pub. No.: WO2022/107296
PCT Pub. Date: May 27, 2022

(65) Prior Publication Data
US 2023/0412624 A1  Dec. 21, 2023

(51) Int. Cl.
*H04L 9/40* (2022.01)

(52) U.S. Cl.
CPC ............... *H04L 63/1425* (2013.01)

(58) Field of Classification Search
CPC .................................. H04L 63/1425
(Continued)

(56) References Cited

U.S. PATENT DOCUMENTS

2017/0126724 A1  5/2017  Zhong et al.
2019/0190938 A1*  6/2019  Oba ..................... H04L 43/16
(Continued)

FOREIGN PATENT DOCUMENTS

WO  2015/186662 A1  12/2015
WO  WO-2020028950 A1 *  2/2020  ........... G06F 21/602

OTHER PUBLICATIONS

Patrick Duessel, et al., "Detecting zero-day attacks using context-aware anomaly detection at the application-layer", International Journal of Information Security (IJIS), vol. 16, No. 5, Jul. 20, 2016, 16 pages, XP036307590.
(Continued)

*Primary Examiner* — Lan Dai T Truong
(74) *Attorney, Agent, or Firm* — XSENSUS LLP (57) ABSTRACT

An estimation device includes processing circuitry configured to generate a feature quantity by performing invertible transformation on a payload of a packet character by character with respect to each packet determined to be abnormal or normal by an abnormality detector, and give a determination result as to whether a packet is abnormal or normal to the generated feature quantity, learn a model that classifies whether the packet is abnormal or normal by machine learning using the feature quantity of the payload of the packet and the determination result as to whether the packet is abnormal or normal as teacher data, extract a number of dimensions of the feature quantity in which a contribution degree to classification is equal to or greater than a predetermined value in the learned model, and estimate a cause part of abnormality in the payload of the packet determined to be abnormal.

14 Claims, 6 Drawing Sheets

(58) Field of Classification Search
USPC .......................................................... 726/23
See application file for complete search history.

(56) References Cited

U.S. PATENT DOCUMENTS

2022/0060756 A1* 2/2022 Nishi ................. H04N 21/4348
2022/0141096 A1* 5/2022 Chien .................. H04L 41/142
709/223

OTHER PUBLICATIONS

Amarasinghe et al, "Toward Explainable Deep Neural Network based Anomaly Detection", IEEE: 11th International Conference on Human System Interaction, 2018, 7 pages.

* cited by examiner

| BYTE NUMBER | 1 | 2 | 3 | - | 18 | 19 | 20 | 21 | - | 41 | 42 | 43 |
|---|---|---|---|---|---|---|---|---|---|---|---|---|
| NORMAL | B | e | l | ~ | 1 | S | p | e | ~ | 1 | 0 | 0 |
| ABNORMAL PATTERN 1 | B | e | l | ~ | 5 | S | p | e | ~ | 1 | 0 | 0 |
| ABNORMAL PATTERN 2 | B | e | l | ~ | 1 | S | p | e | ~ | 1 | 0 | null |
| ABNORMAL PATTERN 3 | B | e | l | ~ | 1 | S | p | e | ~ | 4 | 0 | 0 |

```
Beltconveyor0102401SpeedLv=0100FlowSpeed=190
Beltconveyor0102405SpeedLv=0200FlowSpeed=168
Beltconveyor0102401SpeedLv=0200FlowSpeed=443
```

ESTIMATION DEVICE, ESTIMATION METHOD, AND ESTIMATION PROGRAM

CROSS-REFERENCE TO RELATED APPLICATION

The present application is based on PCT filing PCT/JP2020/043291, filed Nov. 19, 2020, the entire contents of which are incorporated herein by reference.

TECHNICAL FIELD

The present invention relates to an estimation device, an estimation method, and an estimation program for estimating which part of a payload of a packet is the cause of abnormality determination with respect to a packet determined to be abnormal.

BACKGROUND ART

Conventionally, an abnormality detector using deep learning or the like has been proposed. When the cause of abnormality detection by an abnormality detector can be explained, it is useful for the user to make a decision for taking an appropriate measure against the detected abnormality. In recent years, in order to explain the determination of the deep learning model, a method of estimating a cause part in the feature quantity input into the explanatory model and a cause part in the original data of the feature quantity has been proposed.

CITATION LIST

Non Patent Literature

Non Patent Literature 1: K. Amarasinghe et al., "Toward Explainable Deep Neural Network based Anomaly Detection," IEEE: 11th International Conference on Human System Interaction, 2018.

SUMMARY OF INVENTION

Technical Problem

However, some abnormality detectors using deep learning of the related art perform non-invertible transformation from original data into a feature quantity. In that case, even when the abnormal part of the feature quantity is found, it may be difficult to estimate the cause part of original data. For example, even when the abnormality detector determines that a certain packet is abnormal, it may not be possible to ascertain which part of the payload of the packet is the cause of abnormality determination. Therefore, an object of the present invention is to solve the above problem and to estimate which part of the payload of a packet is the cause of abnormality determination with respect to a packet determined to be abnormal.

Solution to Problem

In order to solve the above problem, the estimation device includes: processing circuitry configured to: generate a feature quantity by performing invertible transformation on a payload of a packet character by character with respect to each packet determined to be abnormal or normal by an abnormality detector, and give a determination result as to whether a packet is abnormal or normal to the generated feature quantity; learn a model that classifies whether the packet is abnormal or normal by machine learning using the feature quantity of the payload of the packet and the determination result as to whether the packet is abnormal or normal as teacher data; extract a number of dimensions of the feature quantity in which a contribution degree to classification is equal to or greater than a predetermined value in the learned model; and estimate a cause part of abnormality in the payload of the packet determined to be abnormal using the extracted number of dimensions of the feature quantity, and outputs a result of estimation.

Advantageous Effects of Invention

According to the present invention, it is possible to estimate which part of the payload of a packet is the cause of abnormality determination with respect to a packet determined to be abnormal.

DESCRIPTION OF EMBODIMENTS

Hereinafter, a mode (embodiment) for carrying cut the present invention will be described with reference to the drawings. The present invention is not limited to the embodiments described below.

Figure 1:
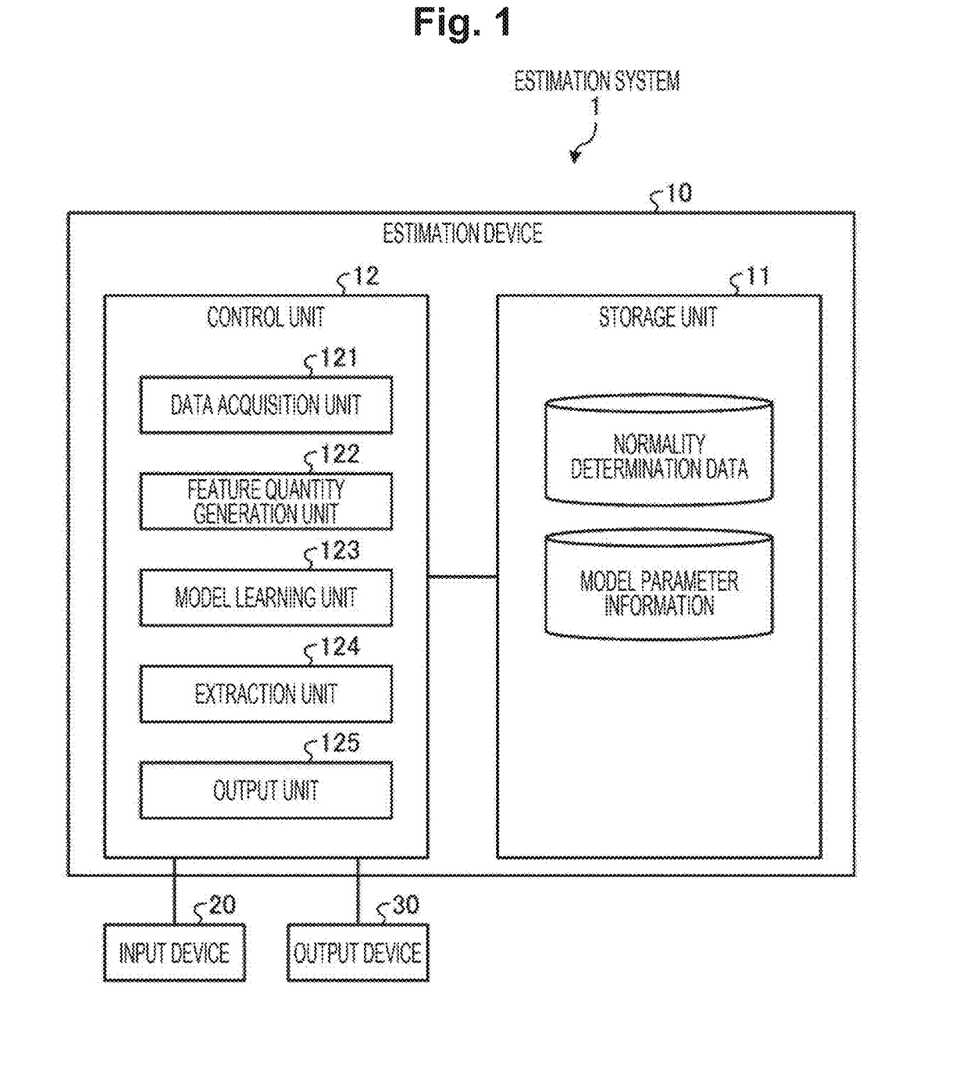
FIG. 1 is a diagram illustrating a configuration example of as estimation system.

[Configuration Example] A configuration example of an estimation system. including the estimation device of the present embodiment will be described. As illustrated in FIG. 1, the estimation system 1 includes, for example, an estimation device 10, an input device 20, and an output device 30.

The estimation device 10 estimates which part of the payload is the cause of abnormality determination with respect to a packet determined to be abnormal, in packets of communication data.

The input device 20 receives inputs of various pieces of data (for example, a packet determined to be abnormal) used by the estimation device 10. The output device 30 outputs the data output from the estimation device 10. For example, the output device 30 displays the estimation result of the estimation device 10 on the monitor.

The estimation device 10 includes a storage unit 11 and a control unit 12. The storage unit 11 stores various pieces of data to be referred to when the control unit 12 executes processing. The storage unit 11 stores, for example, normality determination data and model parameter information. The normality determination data is data of a packet group determined to be normal by an abnormality detector (not illustrated).

The model parameter information is information indicating parameters used when a model learning unit 123 (described later) learns a model. For example, when the model to be learned by the model learning unit 123 is a model using a decision tree, the model parameter information indicates max depth in the decision tree, the number of branch conditions, and the like.

The control unit 12 controls the entire estimation device 10. The control unit 12 includes, for example, a data acquisition unit 121, a feature quantity generation unit 122, a model learning unit 123, an extraction unit 124, and an output unit 125.

The data acquisition unit 121 acquires various pieces of data from the input device 20. For example, the data acquisition unit 121 acquires data of a packet group determined to be abnormal by the abnormality detector from the input device 20.

For each of the packets determined to be abnormal/normal by the abnormality detector, the feature quantity generation unit 122 generates a feature quantity by performing invertible transformation on the payload of the packet character by character. Then, the feature quantity generation unit 122 gives a determination result as to whether the packet is abnormal or normal to the generated feature quantity of the payload of the packet.

For example, the feature quantity generation unit 122 extracts the payload of the packet determined to be abnormal and acquired by the data acquisition unit 121, and extracts the payload from the packet of the normality determination data in the storage unit 11. Then, the feature quantity generation unit 122 generates a feature quantity by performing the invertible transformation on the payload of each extracted packet character by character.

For example, the feature quantity generation unit 122 regards the payload of each packet as a hexadecimal number byte string and transforms each byte into a decimal number to generate the feature quantity. Then, the feature quantity generation unit 122 gives a determination result as to whether the packet is abnormal or normal to the generated feature quantity of the payload of the packet.

For example, the payload extracted by the feature quantity generation unit 122 from each of the packet determined to be normal and the packet determined co be abnormal is x illustrated in the following formula (1).

[Math. 1]

$$x = (x_1, x_2 \ldots x_n) \mathbb{R}^n \qquad \text{Formula (1)}$$

Here, for example, when the feature quantity generation unit 122 performs invertible transformation based on the ASCII code table, the invertible transformation is performed on the character string of the payload of the packet character by character, and the number of dimensions after the transformation is made equal to the length of the payload. In addition, the feature quantity generation unit 122 transforms a character string (hexadecimal number: 0x00 to 0xff) of the payload into a numeric string (decimal number: 0 to 255 according to the ASCII code table. For example, the feature quantity generation unit 122 transforms the payload x=hello into x='104 101 108 108 111'. Note that the feature quantity generation unit 122 transforms the payload by distinguishing between upper case and lower case.

The model learning unit 123 uses the feature quantity of the payload of the packet and the determination result as to whether the packet is abnormal or normal, which are generated by the feature quantity generation unit 122, as teacher data, and performs learning of a model for classifying whether the packet is abnormal or normal by machine learning. The model to be learned is a model with high interpretability. The model with high interpretability is, for example, a model in which it is easy to interpret which feature quantity greatly contributes to the classification by the model.

For example, the above model is a model using a decision tree, linear regression, logistic regression, or the like. Model parameter information in the storage unit 11 is used for model learning.

The extraction unit 124 extracts a feature in which a contribution degree is equal to or greater than a predetermined value in the model learned by the model learning unit 123. For example, the extraction unit 124 measures how much the value of each dimension constituting the feature quantity contributes to the normal/abnormal classification in the model in the above model. Then, the extraction unit 124 extracts, as a feature, the number of dimensions of the feature quantity in which the measured contribution degree is equal to or greater than a predetermined value.

Figure 4:
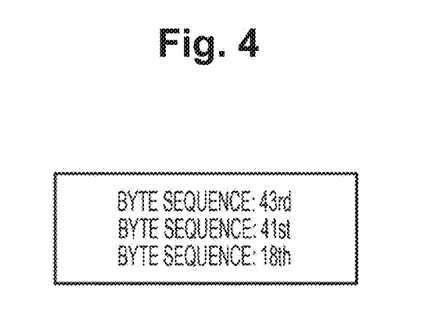
FIG. 4 is a diagram illustrating an example of features extracted by an extraction unit in FIG. 1.

For example, in a case where the byte string of the feature quantity in which the contribution degree is equal to or greater than the predetermined value is the 43rd, the 41st, and the 18th, the extraction unit 124 extracts "byte string: 43rd, byte string: 41st, and byte string: 18th" as a feature as illustrated in FIG. 4.

For example, a case where the model learned by the model learning unit 123 is a model using a decision tree is considered. In this case, the extraction unit 124 extracts, as a feature, the number of dimensions of the feature quantity written in the branch condition from the node in which the branch condition in the decision tree is written.

The output unit 125 estimates a cause part of abnormality in the payload of the packet determined to be abnormal using the feature (for example, the number of dimensions of the feature quantity) in which the contribution degree is equal to or greater than the predetermined value and which is extracted by the extraction unit 124, and outputs the result of the estimation.

For example, the output unit 125 outputs the feature (for example, "byte string: 43rd, byte string: 41st, and byte string: 18th" illustrated in FIG. 4) extracted by the extraction unit 124 to the output device 30 as the estimation result of the abnormality cause part in the payload of the packet determined to be abnormal. As a result, the user of the estimation system 1 can confirm which byte of the payload of the packet determined to be abnormal is estimated as a cause part of abnormality.

Note that the output unit 125 may output information obtained by visualizing a part estimated as a cause part of abnormality in the payload of the packet determined to be abnormal based on the feature extracted by the extraction unit 124.

Figure 5:
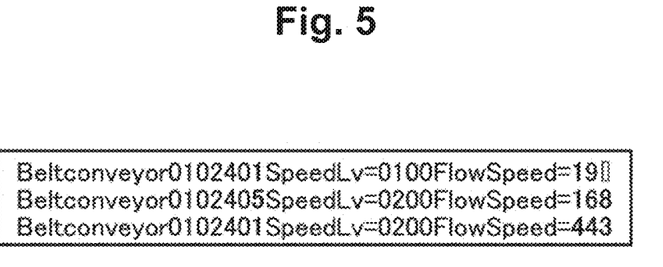
FIG. 5 is a diagram illustrating an output example of a part estimated as a cause part of an abnormality in the payload in the packet determined to be abnormal.

For example, based on the features extracted by the extraction unit 124, the output unit 125 may output, to the output device 30, data in which a part estimated as a cause part of abnormality is emphasized by highlighting or the like in the payload in the packet determined to be abnormal (refer to FIG. 5).

As a result, the user of the estimation system 1 can easily visually confirm which part of the payload of the packet is estimated as the cause part of abnormality.

Figure 2:
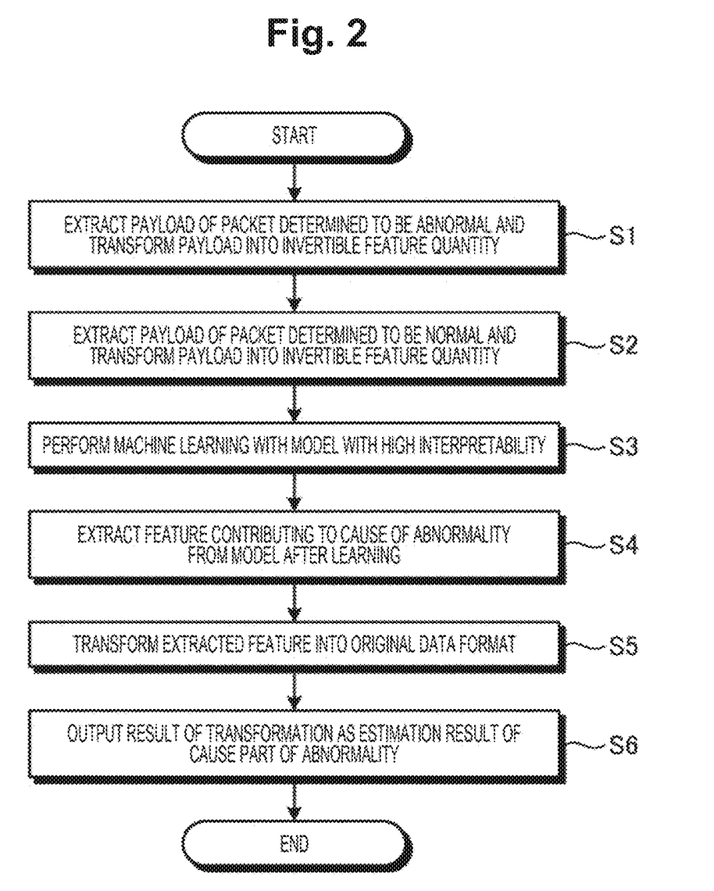
FIG. 2 is a flowchart illustrating an example of a processing procedure of the estimation system.

[Example of Processing Procedure] Next, an example of a processing procedure of the estimation system 1 will be described with reference to FIG. 2. The data acquisition unit 121 of the estimation device 10 acquires data (packet) determined to be abnormal. Then, the feature quantity generation unit 122 extracts the payload of the packet determined to be abnormal and transforms the payload into an invertible feature quantity (S1). In addition, the feature quantity generation unit 122 gives a determination result indicating that the packet is abnormal to the feature quantity of the payload of the packet transformed in S1.

Further, the feature quantity, generation unit 122 acquires a packet determined to be normal from the normality determination packet data. Then, the feature quantity generation unit 122 extracts the payload of the packet determined to be normal and transforms the payload into an invertible feature quantity (S2). In addition, the feature quantity generation unit 122 gives a determination result indicating that the packet is normal to the feature quantity of the payload of the packet transformed in S2.

Thereafter, the model learning unit 123 uses the feature quantity of the payload of the packet transformed in S1 and S2 and the determination result as to whether the packet is abnormal or normal as teacher data, and performs machine learning with a model with high interpretability (S3). Then, the extraction unit 124 extracts the feature contributing to the cause of abnormality from the model after the machine learning (S4). For example, the extraction unit 124 measures the contribution degree of classification of each feature quantity to abnormality from the model after the machine learning, and extracts the feature (for example, the number of dimensions of the feature quantity) in which the measured contribution degree is equal to or greater than a predetermined value.

After S4, the output unit 125 transforms the features extracted in S4 into the original data format (S5), and outputs the result of the transformation in S5 as the estimation result of the cause part of abnormality (S6). For example, the output unit 125 outputs data in which a part estimated as a cause part of abnormality is emphasized by highlighting or the like in the payload in the packet determined to be abnormal, to the output device 30 (refer to FIG. 5).

In this manner, the estimation system 1 can estimate which part of the payload of the packet is the cause of abnormality determination with respect to a packet determined to be abnormal.

[Experimental Result] Next, experimental results of the estimation device 10 will be described with reference to FIGS. 3 to 5. Here, with respect to a packet determined to be abnormal by the abnormality detector, whether the estimation device 10 extracts an abnormal part in the payload of the packet and does not extract a part other than the abnormal part was experimented.

Experimental Conditions (1) In the experiment, a packet given a label of a determination result of normality/abnormality was used. For the packet to which the label of the abnormality determination result was given, three types of packets (abnormal pattern 1 to 3) having different abnormal parts in the payload were prepared (refer to FIG. 3). In the byte string illustrated in the abnormal pattern 1 to 3 illustrated in FIG. 3, hatched parts indicate abnormal parts. For example, the packet of the abnormal pattern 1 is a packet in which the 18th byte (function code) of the payload is different from that of a normal packet. The abnormal pattern 2 is a packet in which a value that can be taken by the 43rd byte of the payload is different from that of the normal packet. The abnormal pattern 3 is a packet in which a value that can be taken by the 41st byte of the payload is different from that of the normal packet.

(2) The estimation device 10 estimated, one by one, which byte of the payload of the packet was abnormal.

(3) When the estimation device 10 performed invertible transformation on a payload, each byte (hexadecimal number: 0x00 to 0xff) of the payload was transformed into a numerical value (decimal number: 0 to 255).

(4) Labeling of normality/abnormality after transformation of the payload was performed manually.

(5) The model with high interpretability used by the estimation device 10 is a model using a decision tree.

Evaluation

The estimation device 10 extracted an abnormal part (hatched part in FIG. 1) of the payload of the packet, and evaluated whether or not a part other than the abnormal part (other than the hatched part in FIG. 1) was extracted.

Figure 3:
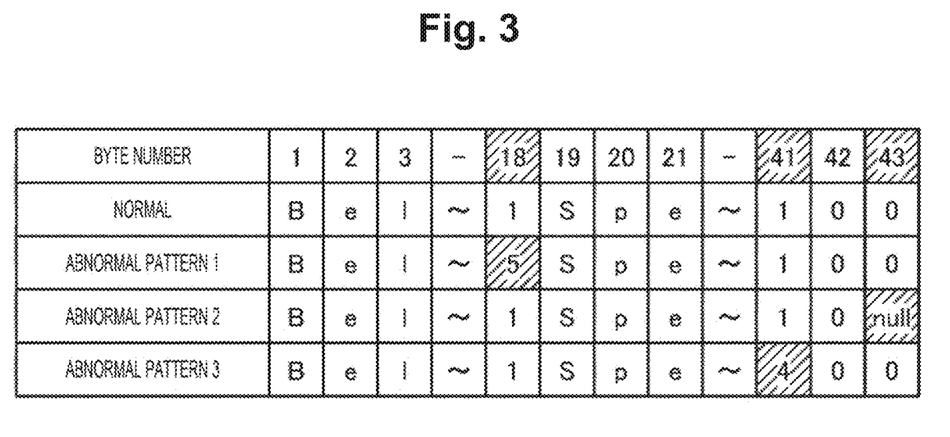
FIG. 3 is a view illustrating an example of a payload of a packet determined to be normal and a payload of a packet determined to be abnormal.

For example, the estimation device 10 evaluated as OK when the 18th byte was extracted as the abnormal part in the payload of the packet of the abnormal pattern 1 illustrated in FIG. 3, and evaluated as OK when the 43rd byte was extracted as the abnormal part in the payload of the packet of the abnormal pattern 2. Further, the estimation device 10 evaluated as OK when the 41st byte was extracted as the abnormal part in the payload of the packet of the abnormal pattern 3.

Result

Whether or not the estimation device 10 has correctly extracted the abnormal part of the payload of The packet determined to be abnormal as a result of the experiment under the above experimental conditions will be described with reference to FIG. 4. FIG. 4 illustrates the number of the byte string of the abnormal part of the payload extracted by the estimation device 10.

As illustrated in FIG. 4, the estimation device 10 extracted the 18th byte, the 41st byte, and the 43rd byte at 3 abnormal parts of the payload of the packet (regardless of the order). In this experiment, since the abnormal parts are set in advance at three parts of the 18th byte, the 41st byte, and the 43rd byte of the payload of the packet, it has been confirmed that the estimation device 10 correctly extracted the abnormal part of the payload and did not extract parts other than the abnormal part of the payload.

Note that, as a supplement, FIG. 5 illustrates an example in which the estimation device 10 outputs a part extracted as an abnormal part of the payload of the packet in a color different from other parts of the payload. Note that a bold part in FIG. 5 indicates a part output in a color different from the color of other parts.

With the leftmost ("B" in FIG. 5) of the payload illustrated in FIG. 5 as the 1st byte, the estimation device 10 outputs three byte numbers (the 18th byte, the 41st byte, and the 43rd byte) extracted as abnormal parts in colors different from the colors of the other parts. In addition, in FIG. 5, the square at the 43rd byte of the payload on the first line indicates null. When the payload of the abnormal patterns 1 to 3 illustrated in FIG. 3 is compared with the output result illustrated in FIG. 5, it can be seen that an abnormal part of the payload of the packet is correctly extracted.

[System Configuration and the Like] In addition, each component of each unit illustrated is functionally conceptual, and does not have to be physically configured as illustrated in the drawings. That is, a specific form of distribution and integration of individual devices is not limited to the illustrated form, and all or a part thereof can be functionally or physically distributed and integrated in any unit according to various loads, usage conditions, and the like. Furthermore, all or any part of each processing function performed in each device can be implemented by a CPU and a program executed by the CPU, or can be implemented as hardware by wired logic.

In addition, among the processing described in the above embodiment, all or a part of processing described as being automatically performed may be manually performed, or all or a part of processing described as being manually performed may be automatically performed by a known method. In addition, the processing procedure, the control procedure, the specific name, and the information including various data and parameters that are illustrated in the document and the drawings can be freely changed unless otherwise specified.

[Program] The estimation device 10 can be implemented by installing a program in a desired computer as package or online software. For example, by causing an information processing device to execute the above program, the information processing device can be caused to function as the estimation device 10 of each embodiment. The information processing device mentioned here includes a desktop or a notebook personal computer. In addition, the information processing device also includes a mobile communication terminal such as a smartphone, a mobile phone, and a personal handyphone system (PHS), a terminal such as a personal digital assistant (PDA), and the like.

In addition, in a case where a terminal device used by a user is implemented as a client, the estimation device 10 can also be implemented as a server device that provides a service related to the processing described above to the client. In this case, the server device may be implemented as a web server, or may be implemented as a cloud that provides services related to the processing described above by outsourcing.

Figure 6:
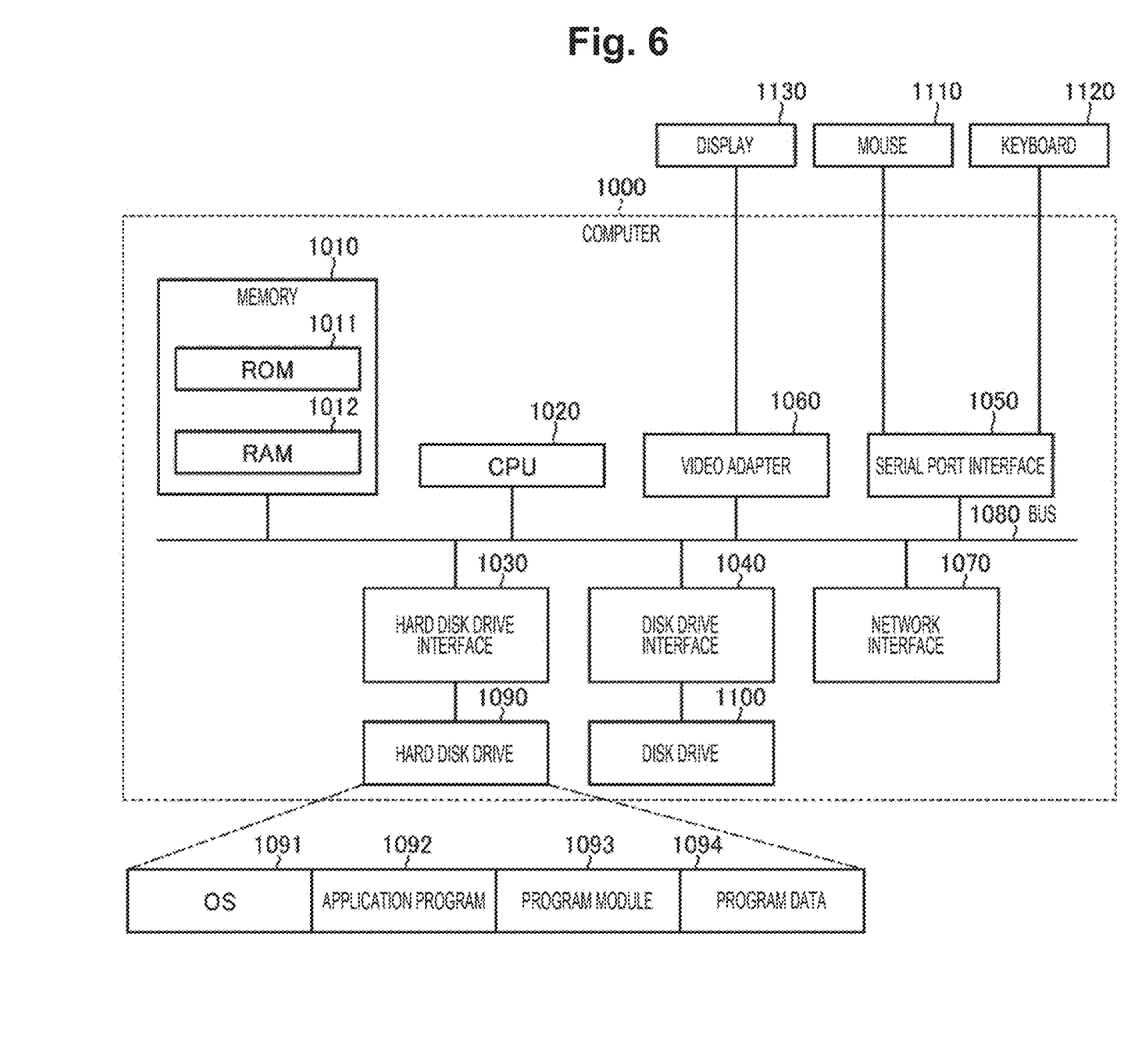
FIG. 6 is a diagram illustrating a configuration example of a computer that executes an estimation program.

FIG. 6 is a diagram illustrating an example of the computer that executes an estimation program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program that defines each processing executed by the estimation device 10 is implemented as the program module 1093 in which a code executable by the computer is written. The program module 1093 is stored in, for example, the hard disk drive 1090. For example, the program module 1093 for executing processing similar to the functional configurations in the estimation device 10 is stored in the hard disk drive 1090. Note that the hard disk drive 1090 may be replaced with an SSD.

Furthermore, each piece of data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 to the RAM 1012, and executes the program module 1093 and the program data 1094 as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from the other computer via the network interface 1070.

REFERENCE SIGNS LIST

10 Estimation device
20 Input device
30 Output device
11 Storage unit
12 Control unit
121 Data acquisition unit
122 Feature quantity generation unit
123 Model learning unit
124 Extraction unit
125 Output unit

The invention claimed is:

1. An estimation device comprising:
processing circuitry configured to:
generate a feature quantity by performing invertible transformation on a payload of a packet character by character with respect to each packet determined to be abnormal or normal by an abnormality detector, and give a determination result as to whether a packet is abnormal or normal to the generated feature quantity;
learn a model that classifies whether the packet is abnormal or normal by machine learning using the feature quantity of the payload of the packet and the determination result as to whether the packet is abnormal or normal as teacher data;
extract a number of dimensions of the feature quantity in which a contribution degree to classification is equal to or greater than a predetermined value in the learned model; and
estimate a cause part of abnormality in the payload of the packet determined to be abnormal using the extracted number of dimensions of the feature quantity, and output a result of estimation.

2. The estimation device according to claim 1, wherein the model is a model using a decision tree, and
the processing circuitry is further configured to:
extract the number of dimensions of the feature quantity written in a branch condition from a node in which the branch condition in the decision tree obtained by the machine learning is written as the number of dimensions of the feature quantity in which the contribution degree is equal to or greater than a predetermined value.

3. The estimation device according to claim 1, wherein the model is a model using linear regression or logistic regression.

4. The estimation device according to claim 1, wherein the processing circuitry is further configured to:
specify a part estimated as a cause part of abnormality in the payload of the packet determined to be abnormal based on the extracted number of dimensions of the feature quantity, and outputs information obtained by visualizing the specified part as a result of the estimation.

5. The estimation device according to claim 1, wherein the invertible transformation transforms a character string into a numeric string according to ASCII code table.

6. The estimation device according to claim 1, wherein the model is a model using a decision tree.

7. The estimation device according to claim 1, wherein the model is a model using linear regression.

8. The estimation device according to claim 1, wherein the model is a model using logistic regression.

9. The estimation device according to claim 1, wherein the processing circuitry is further configured to:
specify a part estimated as a cause part of abnormality in the payload of the packet determined to be abnormal based on the extracted number of dimensions of the feature quantity.

10. An estimation method comprising:
generating a feature quantity by performing invertible transformation on a payload of a packet character by character with respect to each packet determined to be abnormal or normal by an abnormality detector, and giving a determination result as to whether a packet is abnormal or normal to the generated feature quantity;
learning a model that classifies whether the packet is abnormal or normal by machine learning using the feature quantity of the payload of the packet and the determination result as to whether the packet is abnormal or normal as teacher data;
extracting a number of dimensions of the feature quantity in which a contribution degree to classification is equal to or greater than a predetermined value in the learned model; and
estimating a cause part of abnormality in the payload of the packet determined to be abnormal using the extracted number of dimensions of the feature quantity, and outputting a result of estimation.

11. The estimation method according to claim 10, wherein the model is a model using a decision tree.

12. The estimation method according to claim 10, wherein the model is a model using linear regression.

13. The estimation method according to claim 10, wherein the model is a model using logistic regression.

14. A non-transitory computer-readable recording medium storing therein an estimation program that causes a computer to execute a process comprising:
generating a feature quantity by performing invertible transformation on a payload of a packet character by character with respect to each packet determined to be abnormal or normal by an abnormality detector, and giving a determination result as to whether a packet is abnormal or normal to the generated feature quantity;
learning a model that classifies whether the packet is abnormal or normal by machine learning using the feature quantity of the payload of the packet and the determination result as to whether the packet is abnormal or normal as teacher data;
extracting a number of dimensions of the feature quantity in which a contribution degree to classification is equal to or greater than a predetermined value in the learned model; and
estimating a cause part of abnormality in the payload of the packet determined to be abnormal using the extracted number of dimensions of the feature quantity, and outputting a result of estimation.

* * * * *